UNITED STATES PATENT OFFICE.

ANTON BERGMANN, OF BOERNE, TEXAS.

OINTMENT FOR SKIN DISEASES.

SPECIFICATION forming part of Letters Patent No. 422,703, dated March 4, 1890.

Application filed September 19, 1889. Serial No. 324,427. (No specimens.)

*To all whom it may concern:*

Be it known that I, ANTON BERGMANN, a citizen of the United States, residing at Boerne, in the county of Kendall and State of Texas, have invented new and useful Improvements in Liniment or Ointment for Curing Skin Diseases, of which the following is a specification.

The object of this invention is to provide a liniment or ointment for the treatment of ring worm or cutaneous troubles, and the compound is described in the following specification and claim.

Said liniment is prepared by means of soap, tobaccco extract, water, turpentine, and tincture of arnica. The tobacco extract can be prepared by boiling leaf-tobacco in water. I have found a good extract to be obtained by boiling two pounds of leaf-tobacco in such a quantity of water as to obtain two quarts of extract.

The relative proportion of the liniment ingredients can be varied somewhat. I have found good results to be obtained by using the following proportions: three pounds of soap, four ounces of tobacco-extract, one and one-half pint of water, six pints of turpentine, and one ounce tincture of arnica. These ingredients are mixed and heated until the water has evaporated. The heating can be stopped when the liniment is of the required consistency. By heating for a longer or shorter period the liniment is obtained in a harder or softer state, so that the liniment can be obtained either in hard or liquid form, as desired.

The liniment or ointment can be packed into bottles or suitable receptacles to be kept until required.

The liniment or ointment when used is rubbed onto the troublesome spot by the fingers or a rag or sponge.

Arnica used alone has no healing effect on a wound infested with worms; but if mixed with the other above-described ingredients and applied as directed the wound will be no longer troubled by gnats or flies and will heal rapidly. I have found, however, that if arnica is omitted, though the other ingredients of the liniment will kill the worms in a wound, the gnats or flies will again lay their eggs on the lips of the wound, and in a few days the wound will be again infested with worms. This result does not occur when the liniment or ointment is prepared with arnica, as above described.

What I claim as new, and desire to secure by Letters Patent, is—

A liniment compound consisting of soap, tobacco-extract, water, turpentine, and tincture of arnica, mixed together in the manner and in the proportions specified.

In testimony whereof I have hereunto set my hand in the presence of two subscribing witnesses.

ANTN. BERGMANN.

Witnesses:
JAMES M. SAUER,
HILMAR G. FROEBEL.